No. 724,516. PATENTED APR. 7, 1903.
E. S. SMITH & H. GILES.
CASH REGISTER.
APPLICATION FILED MAR. 3, 1902.
NO MODEL. 7 SHEETS—SHEET 4.

WITNESSES:
Gustave Dietrich
Edwin H. Dietrich

INVENTORS
Elmer S. Smith
Harvey Giles
BY Chas. C. Gill
ATTORNEY

No. 724,516. PATENTED APR. 7, 1903.
E. S. SMITH & H. GILES.
CASH REGISTER.
APPLICATION FILED MAR. 3, 1902.

NO MODEL. 7 SHEETS—SHEET 5.

WITNESSES:
Gustav Dieterich
Edwin H. Dieterich

INVENTORS
Elmer S. Smith
Harvey Giles
BY Chas. E. Gill
ATTORNEY

No. 724,516. PATENTED APR. 7, 1903.
E. S. SMITH & H. GILES.
CASH REGISTER.
APPLICATION FILED MAR. 3, 1902.
NO MODEL. 7 SHEETS—SHEET 6.

WITNESSES:
Gustave Dieterich
Edwin H Dieterich

INVENTORS.
Elmer S. Smith
Harvey Giles
BY
Chas. C. Gill
ATTORNEY

No. 724,516. PATENTED APR. 7, 1903.
E. S. SMITH & H. GILES.
CASH REGISTER.
APPLICATION FILED MAR. 3, 1902.
NO MODEL. 7 SHEETS—SHEET 7.

WITNESSES:
INVENTORS.
Elmer S. Smith
Harvey Giles
BY
ATTORNEY

UNITED STATES PATENT OFFICE.

ELMER S. SMITH, OF BOUNDBROOK, AND HARVEY GILES, OF SOUTH BOUND-BROOK, NEW JERSEY, ASSIGNORS TO IDEAL CASH REGISTER COMPANY, OF NEW BOUNDBROOK, NEW JERSEY, A CORPORATION OF NEW JERSEY.

CASH-REGISTER.

SPECIFICATION forming part of Letters Patent No. 724,516, dated April 7, 1903.

Application filed March 3, 1902. Serial No. 96,358. (No model.)

*To all whom it may concern:*

Be it known that we, ELMER S. SMITH, a resident of Boundbrook, and HARVEY GILES, a resident of South Boundbrook, Somerset county, New Jersey, citizens of the United States, have jointly invented certain new and useful Improvements in Cash-Registers, of which the following is a specification.

The invention relates to improvements in cash-registers; and it consists in the novel features, structure, and combinations of parts hereinafter described and claimed.

The invention made the subject of the present application embodies certain improvements hereinafter pointed out upon the cash-register made the subject of Letters Patent No. 677,896, granted to us on July 9, 1901, and No. 690,472, granted to us on January 7, 1902. The cash-register shown in the drawings forming a part of this application in certain parts corresponds substantially with features of the registers shown and described in said Letters Patent Nos. 677,896 and 690,472, and said parts are therefore only incidentally referred to hereinafter, having been shown in this application merely for the purpose of clearly illustrating the operation of the features made the subject of the present application.

The cash-register illustrated in the accompanying drawings embodies a series of exposed actuating or setting levers to be moved along the usual columns of numerals on the front face of the register-casing for the purpose of setting certain interior segments into proper operative relation to the register mechanism and an exposed operating crank or handle which is to be thereafter operated for placing the gears of the registering-wheels into direct engagement with the said segments and then effecting the movement of the said segments to their normal position, whereby said segments are caused to operate the registering mechanism to the extent desired and governed by the position given to said segments by the said actuating or setting levers.

In the class of cash-registers referred to the registering-wheels and their gears are mounted upon a shaft supported at its ends in the front ends of arms which are secured to a rock-shaft, so that the registering-wheels and their shaft may be lowered and elevated upon the movement of the aforesaid crank or handle. When registration is to be effected, the registering-wheel shaft is lowered, so that the gear-wheels connected with the registering-wheels may be placed into mesh with the aforesaid segments, and after the registration has taken place the registering-wheel shaft is elevated clear of the aforesaid segments. The registering-wheels are rotated to accomplish the proper registration when their shaft is in its lower position, and at such time the carrying from one registering-wheel to another is effected by suitable intermediate carrying mechanism.

The present invention comprises more especially novel means for compelling the full stroke of the exposed operating crank-handle, means for preventing the crank-handle when violently moved to its extreme positions from injuriously affecting or jarring the interior mechanism of the register, cash-drawer-locking mechanism and means for compelling the operator to return the exposed operating crank-handle to its extreme upward position before the drawer can be locked at its inward position; means for compelling the operator to close the cash-drawer after each registration of a sale, this means preventing the movement of the operating crank-handle from its upper position until the cash-drawer has reached its closed position, means for locking the registering-wheels at the time they have reached the limit of their proper movement, so that they cannot by undue momentum or otherwise be forced beyond the proper limit of their rotation, and means connected with the pawl for supporting the indicating-cylinders in their upper position and with the shaft carrying the registering-wheels for placing said pawl under spring tension during the downward movement of the exposed operating crank-handle, whereby said pawl is caused to engage the frame of the indicating-cylinders when the latter reach their upper position and is relieved from the spring tension during the return movement of said operating crank-handle to its upper position, the said pawl being thus left supporting the indicating-cylinders in their upper position without being under spring tension, whereby the tilting of said pawl from its position wherein it acts as a support for the indicating-cylinders may be accomplished on the movement of any one of the actuating hand-levers with the minimum effort and without compelling the operator to overcome the force of a spring by means of said levers.

The invention will be fully understood from the detailed description hereinafter presented, reference being had to the accompanying drawings, in which—

Fig. 7ª is a transverse section of same on the dotted line 7ª 7ª of Fig. 7.

In the drawings, 50 designates the exterior casing of the register, 51 the cash-drawer, and 52 the spring, which is compressed during the closing of said drawer and which when the said drawer is released from its locking devices drives said drawer to its open position.

Figures 2, 3, 4:
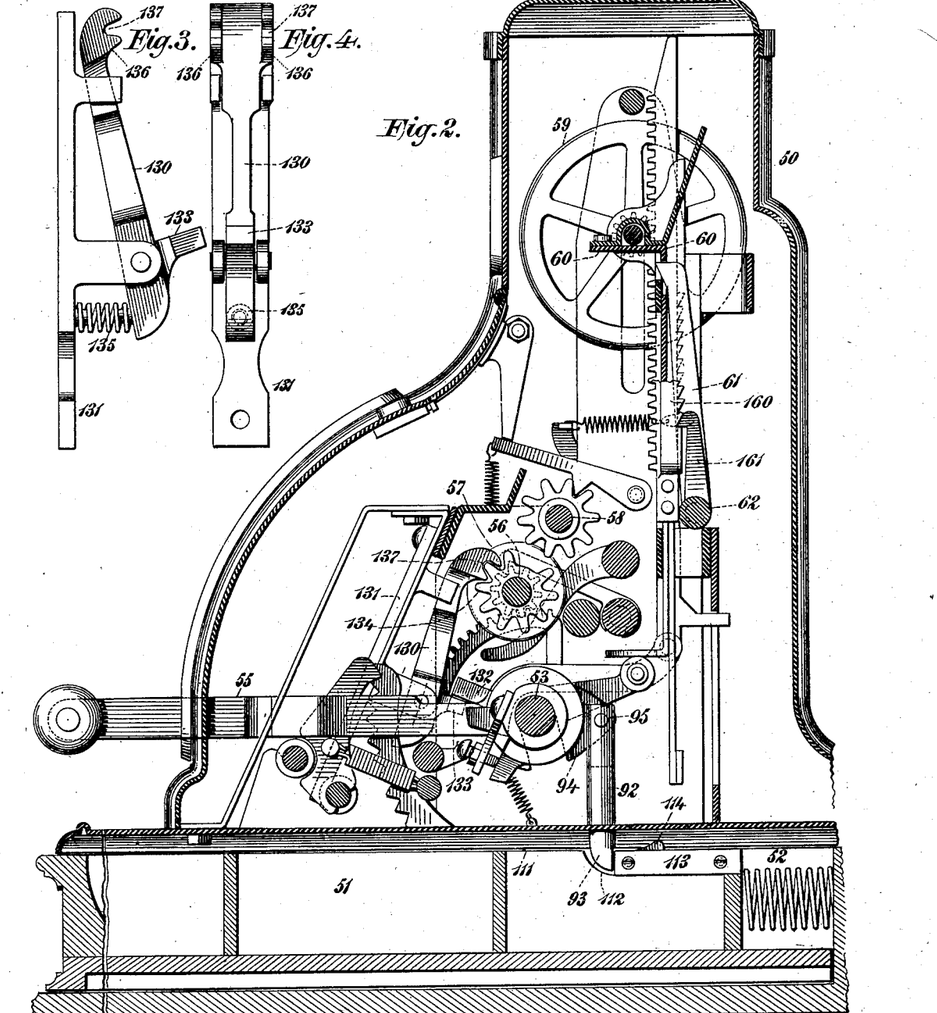
Fig. 2 is a vertical section through the register, the section being taken on a substantially vertical line through the same represented by 2 2 in Fig. 5.
Fig. 3 is an enlarged side elevation of the mechanism adapted to be operated from the driving-shaft of the register for locking the registering-wheels when they have reached the end of their proper movement.
Fig. 4 is a front elevation of same looking at the right-hand side of Fig. 3.

53 denotes the main driving-shaft; 54, the exposed operating crank-handle; 55, the hand actuating or setting levers; 56, the registering-wheel shaft; 57, the registering-wheels; 58, the shaft carrying gear-wheels for setting back the registering-wheels; 59, the indicating cylinders or drums; 60, the vertically-movable frame carrying said indicating cylinders or drums; 61, the pawl-arm for engaging said frame when the latter is in its upper position, as shown in Fig. 2, for there supporting said frame, and 62 the rock-shaft with which said pawl-arm 61 is rigidly connected, all of these features thus designated being substantially identical with like features fully described and shown in the aforesaid Letters Patent No. 677,896, dated July 9, 1901, and consequently not requiring to be specifically described herein.

Figure 8:
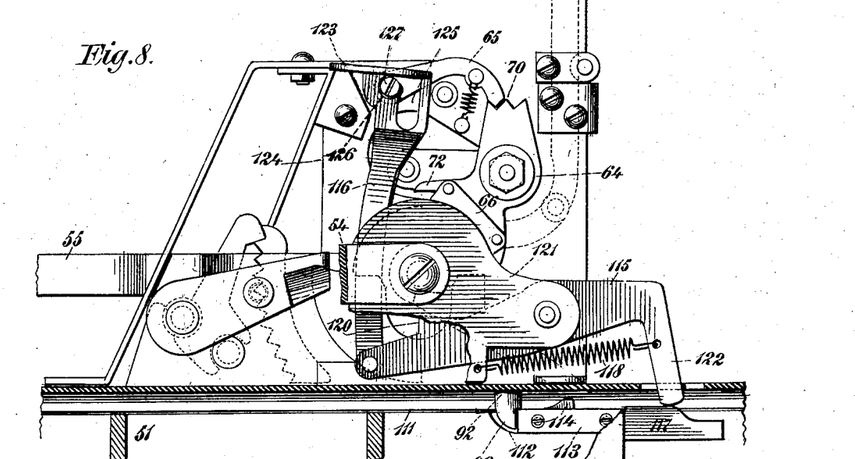
Fig. 8 is a detached view, partly broken away and partly in section, looking at the right-hand end of the interior mechanism of the register, this figure illustrating more particularly the means for compelling the operator to entirely close the cash-drawer before the exposed operating crank-handle can be moved downward from its upper position.
Figures 9, 10, 11, 12, 13, 14, 15:
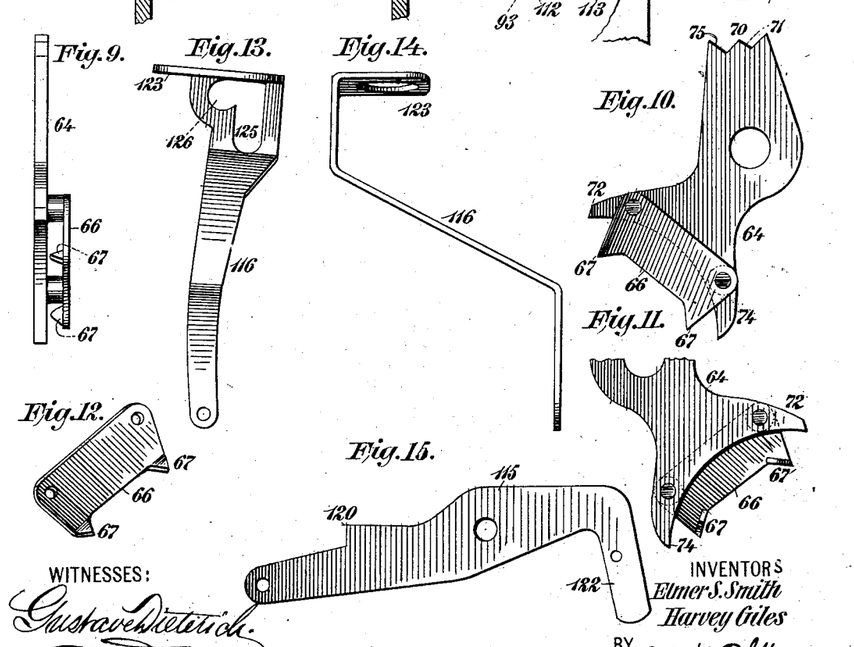
Figs. 9, 10, 11, and 12 are detached views of parts, hereinafter specifically designated, of the full-stroke mechanism for the exposed operating crank-handle.
Figs. 13, 14, and 15 are detached views of the separated parts of the mechanism shown in Fig. 8 for compelling the operator to fully close the cash-drawer before moving the exposed operating crank-handle downward from its upper position.
Figure 16:
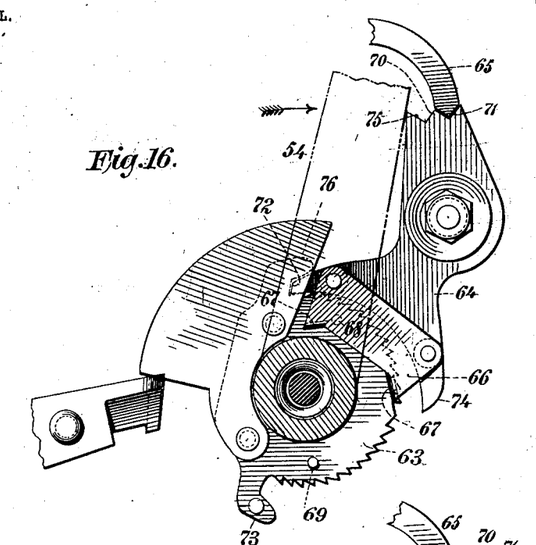
Fig. 16 is a detached view of the mechanism for compelling the operator after starting either downward or upward with the exposed operating crank-handle to perform the full movement thereof, the parts in Fig. 16 being shown in their normal position, with the exposed operating crank-handle, illustrated by dotted lines, in its upper position.
Figure 17:
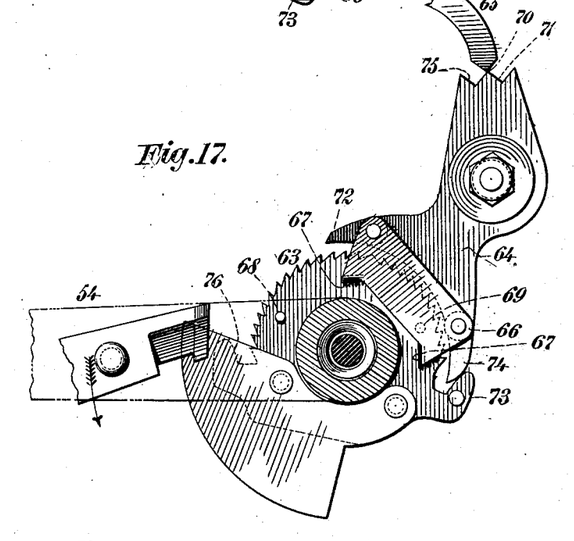
Fig. 17 is a like view of same, this figure, however, illustrating the operating crank-handle as having nearly reached the extreme limit of its lower movement.
Figure 18:
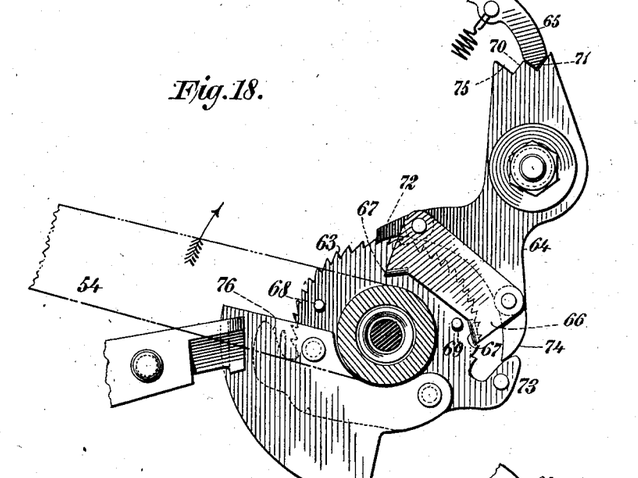
Fig. 18 is a like view of same with the operating crank-handle illustrated at an intermediate position.
Figure 19:
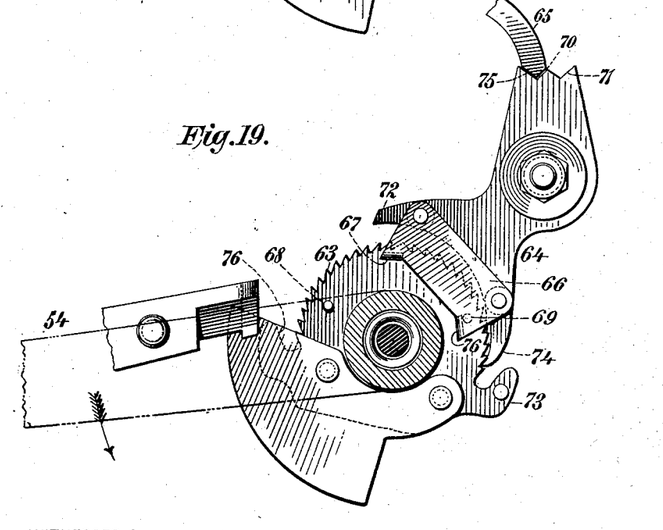
Fig. 19 is a like view of same with the crank-handle shown in its lower position.

We will first describe the means for compelling the full stroke of the exposed operating crank-handle 54, and these means are illustrated in Figs. 1, 8, 9, 10, 11, 12, and 16 to 19, inclusive, and they comprise the ratchet-plate 63, the pivoted pawl-plate 64, the spring-pawl 65 for engaging said plate 64, the plate 66, rigidly secured to the pawl-plate 64 and having the teeth or projections 67, as shown in detail in Figs. 9, 11, and 12, and the pins 68 69, secured upon the ratchet-plate 63 in proper position under certain circumstances hereinafter stated to strike against the teeth 67 during the movement of the driving-shaft 53 under the action of the exposed crank-handle 54. The ratchet-plate 63, pawl-plate 64, and spring-pawl 65 are not in themselves new, they having been shown and described in the aforesaid Letters Patent No. 690,472, dated January 7, 1902. The present invention in regard to this feature of the construction consists in providing the plate 66 upon the pawl-plate 64 and the pins 68 69 upon the ratchet-plate 63, and hence the present description will refer more specifically to these new or added features. The normal position of the ratchet-plate 63 and pawl-plate 64 when the crank-handle 54 is in its upper normal position is illustrated in Fig. 16, and upon a sale having been made the crank-handle 54 is pulled frontward and downward, turning the driving-shaft 53 and ratchet-plate 63, the pin 68 on the ratchet-plate 63 at that time passing above the upper tooth or projection 67 on the plate 66, carried by the pawl-plate 64, and the pin 69 on said ratchet-plate 63 ascending from the rear toward said plate 66, said pin 69 during its upward movement when the crank-handle is properly operated passing upward to the left of the lower tooth 67 of the plate 66 in substantially the relation illustrated in Fig. 18. When the crank-handle 54 is pulled all the way down to its extreme lower position, the plate 66 and pins 68 69 perform at that time no operation whatever, said pins passing alongside of, but not touching, the teeth 67 of the plate 66. Should, however, the operator for any reason conclude not to pull the crank-handle 54 to its extreme down position, but attempt on said crank-handle 54 nearly reaching its down position to arrest the point of the pawl 65 upon the upper end of the tooth 70, Fig. 17, of the pawl-plate 64 and then start the operating crank-handle 54 upward again, (said handle not having completed its full downward movement,) the lower pin 69 on the ratchet-plate 63 on moving downward would strike against the lower tooth 67 of the plate 66 and turn the lower end of the pawl-plate 64 outward to the right, thus causing the upper end of said plate 64 to move to the left and effect the reëngagement of the pawl 65 with the first notch 71 of said plate 64 and the reëngagement of the pawl 72 with the ratchet-wheel 63, thereby preventing any further movement upward of the crank-handle 54 until said crank-handle had been pulled all the way down to its lower position. When the crank-handle 54 has reached its lower position, the point of the pawl 65 will engage the notch 75 in the ratchet-plate 64 and will remain in said notch until the crank-handle 54 is just completing its full upward motion, when the toe 76 of the ratchet-plate 63 will engage the pawl 72 and turn the upper portion of the pawl-plate 64 to the left, thereby causing the point of the pawl 65 to pass from the notch 75 into the notch 71 of said plate. The upper pin 68 and upper tooth 67 thus operate to insure the full upward motion of the crank-handle 54 in the same manner that the lower pin 69 and lower tooth 67 operate to compel a full downstroke of the said handle 54. When the crank-handle 54 is properly moved to its full upward position, the upper pin 68 and upper tooth 67 will perform no function, said pin 68 under said condition simply passing the upper tooth 67 without touching the same. The new features of this part of the invention therefore consist in providing the plate 66, having the teeth 67 and the coöperating pins 68 69. The plate 66 is preferably of the form illustrated in the drawings, being shown in perspective in Fig. 12 and in rear elevation in Fig. 11, and said plate is rigidly secured to the pawl-plate 64 by rivets. The operative parts of this plate, however, are the teeth or projections 67, which are inclined at their edges to form small cams, and we do not desire to limit ourselves to the special form of the entire plate 66, since if it were desired to save metal the middle portions of the said plate could be removed without disturbing the relation of the teeth 67 to the pins 68 69. It is also to be understood that the teeth 67 might be secured to the ratchet-plate 63 and the pins 68 69 to the plate 66 without affecting the result desired, this being merely a transposition of the said teeth and said pins. It is more convenient, however, to apply the teeth 67 to the plate 66 and the pins 68 69 to the ratchet-plate 63.

Figure 1:
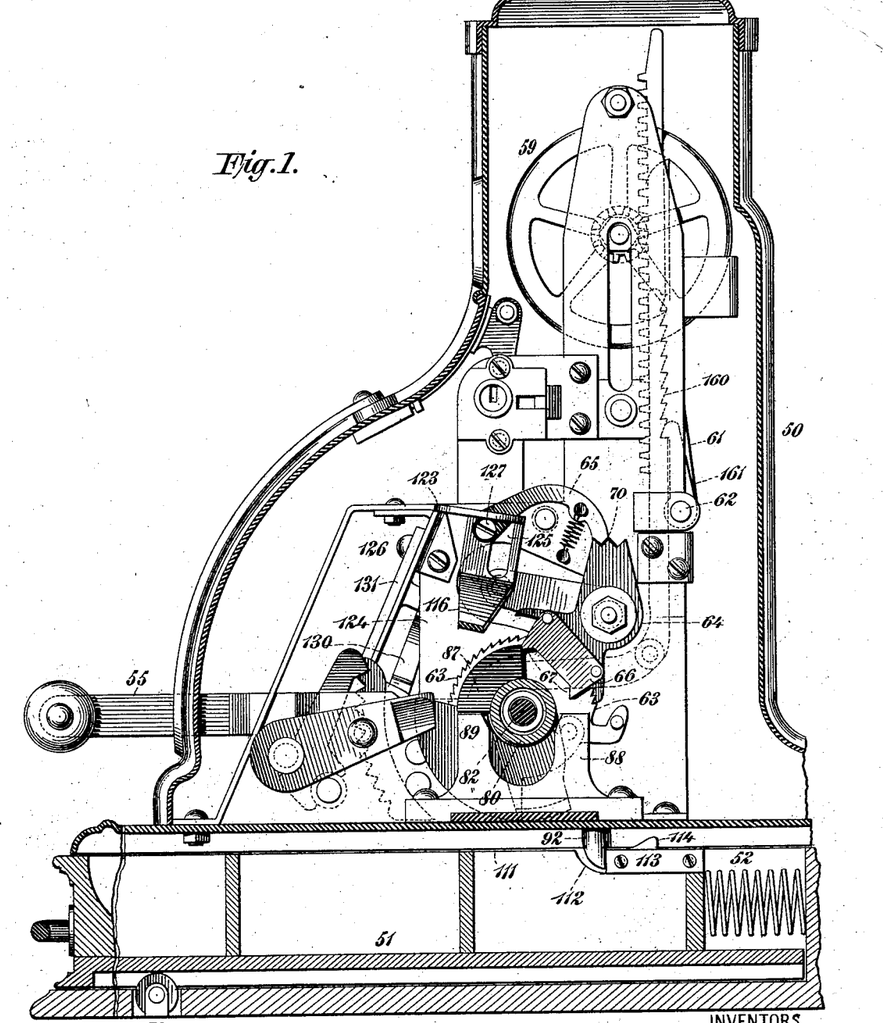
Figure 1 is a central vertical longitudinal section, partly broken away, through the casing and cash-drawer of the cash-register and illustrates the interior mechanism of the register in end elevation, the driving-shaft of the register being in section on the dotted line 1 1 of Fig. 5.
Figure 5:
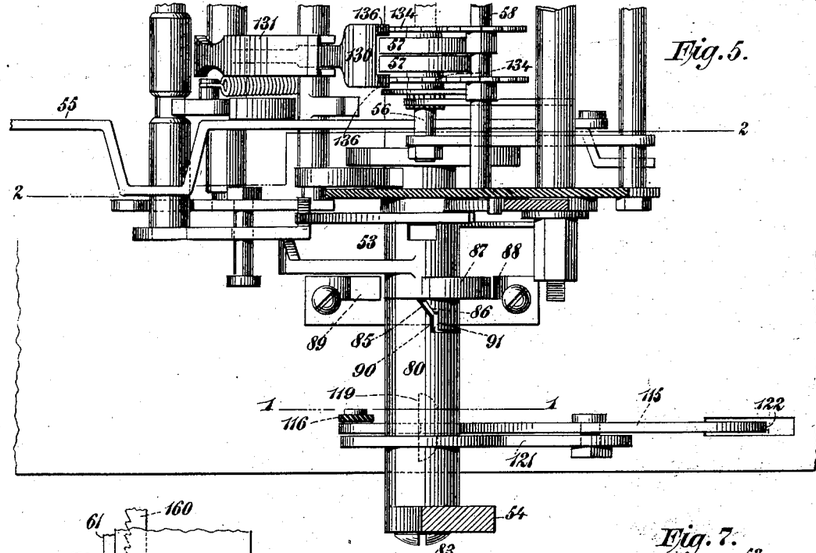
Fig. 5 is a horizontal section, partly broken away, through the right-hand portion of the machine, this section having been taken on a horizontal line above the registering-wheel shaft and looking downward.
Figures 6, 7:
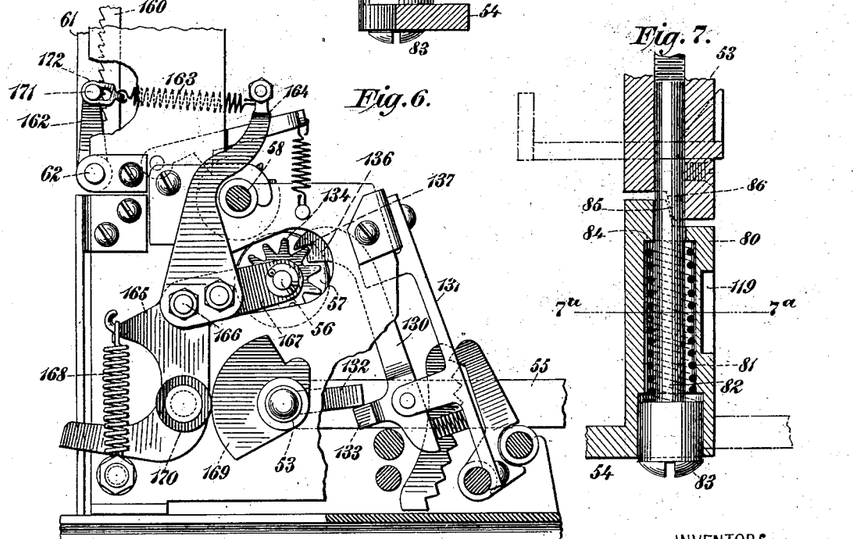
Fig. 6 is an end view, partly broken away and partly in section, looking at the left-hand end of the interior mechanism of the register.
Fig. 7 is a longitudinal section through the driving-shaft of the register and illustrates more especially the means provided for preventing any violent action of the exposed operating crank-handle from materially jarring the interior mechanism of the register.
Figure 7A:
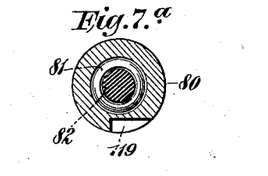

The means for preventing the operating crank-handle 54 when violently moved to its extreme position from injuriously jarring the interior mechanism of the register are more clearly illustrated in Figs. 1, 5, and 7 and comprise a sleeve 80, constituting a movable part of the driving-shaft 53 and having on its outer end the operating crank-handle 54 and at its interior a coiled spring 81, which, as shown in Fig. 7, is coiled about the rod 82, which passes through said sleeve 80 and at its inner end is screwed into the driving-shaft 53. The rod 82 is formed with a head 83, which prevents the escape of the sleeve 80 from the rod 82 and furnishes a bearing for the outer end of the spring 81. The inner end of the spring 81 bears against the shoulder 84, formed at the inner end of the sleeve 80. The adjoining ends of the driving-shaft 53 and sleeve 80 have formed thereon at opposite points, such as at their upper and lower sides, the cam-surfaces 85 86, and the spring 81 is a stout spring, normally pressing the sleeve 80 close against the end of the shaft 53. Upon the end of the shaft 53 is provided the segmental lug 87, which when the crank-handle 54 is at its extreme upward position will contact with a stop 88, and when said operating crank-handle 54 is moved to its lower position will strike a corresponding stop 89, these stops 88 89 being shown in top elevation in Fig. 5 and in side elevation in Fig. 1, wherein also the outline of the lug 87 is shown. When the operating crank-handle 54 is in its normal upward position, the lug 87 will bear against the stop 88 and the spring 81 will bind the inner end of the sleeve 80 against the end of the shaft 53. When the crank-handle 54 is pulled to its downward position, the lug 87 will strike the stop 89 and the movement of the shaft 53 will be arrested thereby. If during the downward movement of the crank-handle 54 the latter should be handled violently, the lug 87 would strike the stop 89, arresting the shaft 53; but the force employed in moving the crank-handle 54 would be prevented from jarring the interior mechanism of the register by reason of the fact that said crank-handle would continue to a limited extent on its downward motion after the lug 87 had reached the stop 89, this further downward motion of the crank-handle 54 being desired and being permitted by the spring 81 and cam-surfaces 85 86. When under the conditions just stated the lug 87 strikes the stop 89, the force still upon the crank-handle 54 would cause the cam-surfaces 85 and 86 to effect the outward movement of the sleeve 80 on the rod 82 against the stress of the compressed spring 81, this outward movement of the sleeve 80, together with the resistance offered by the spring 81, serving to dissipate the undue force which had been applied to the crank-handle 54 and to prevent that force from having injuriously jarred the interior mechanism of the register. The crank-handle 54 is permitted to turn downward a little farther after the lug 87 has struck the stop 89 because of the sliding action of the cam-surfaces 85 86 upon one another and because of there being provided on the adjoining ends of the sleeve 80 and driving-shaft 53 the plain surfaces 90 91, as shown in Fig. 5, which are normally supported from one another, but which are brought into contact when the sleeve has reached the limit of its outward movement and the crank-handle 54 has reached the limit of its movement. When the sleeve 80 starts outward upon the rod 82, due to the inclination of the cam-surfaces 85 86, the crank-handle 54 will continue in its movement until the plain surfaces 90 91 come together, and at that time, the force applied to the handle 54 having been taken up by the spring 81, the handle 54 will come to a rest. The application of undue violence in moving the handle 54 is more apt to occur when said handle is being pulled to its lower position; but the present invention also avoids the jarring of the mechanism of the register should the handle 54 be violently moved to its upper position, since when the handle is violently moved to its upper position and the lug 87 strikes the stop 88 the cams 85 86 will again press the sleeve 80 outward, compressing the spring 81 and relieving the register from unnecessary jar. In the normal condition of the adjoining ends of the shaft 53 and sleeve 80 a little space should be left between the cams 85 on the sleeve 80 and the cams 86 on the shaft 53, this allowing a little freedom between the surfaces of said cams and allowing the crank-handle 54 a small amount of loose play. In Fig. 5 the sleeve 80 is shown close up against the end of the shaft 53, while in Fig. 7 the outer position of said sleeve 80 is illustrated. We regard the sleeve 80 as constituting a movable part of the driving-shaft 53.

Figures 20, 21:
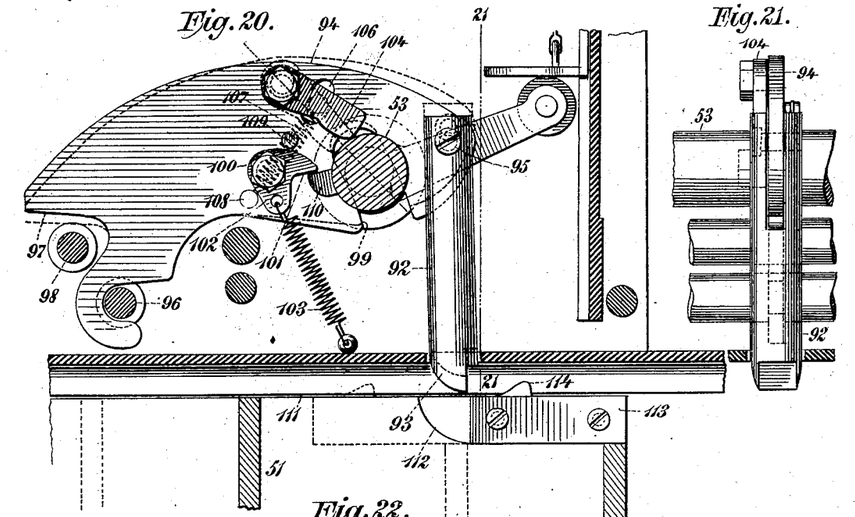
Fig. 20 is an enlarged central vertical section through a portion of the cash drawer and register and illustrating the drawer-locking mechanism, the locking-bolt in this figure being shown as having been partly elevated by the rotation of the driving-shaft and in its extreme upward position by dotted lines.
Fig. 21 is a vertical section of same on the dotted line 21 21 of Fig. 20.
Figures 22, 24:
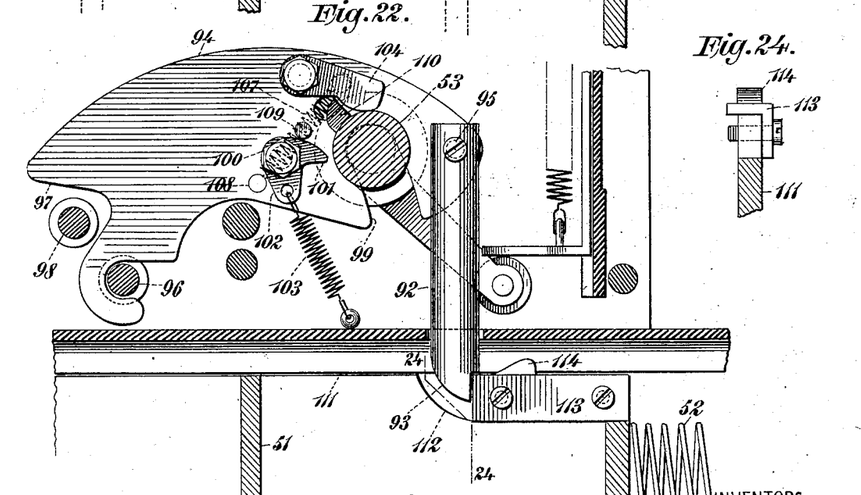
Fig. 22 corresponds with Fig. 20, the locking-bolt in this figure being shown in its lower locking position.
Fig. 24 is a vertical section through a portion of the cash-drawer on the dotted line 24 24 of Fig. 22.
Figure 23:
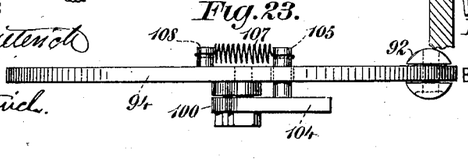
Fig. 23 is a detached top view of the drawer-locking mechanism.

The cash-drawer-locking mechanism and means for compelling the operator to return the exposed operating crank-handle 54 to its extreme upper or initial position before the drawer 51 can be locked at its inward position are illustrated in detail in Figs. 20 to 24, inclusive, and are in part illustrated in Figs. 1, 2, and 8. The bolt for locking the cash-drawer 51 in its closed position is designated by the numeral 92 and is a vertically-disposed rod having the front edges of its lower end rounded or cam-shaped, as designated by the numeral 93, while the upper end of said bolt 92 is slotted to pass upon the rear end of the plate 94, to which it is pivotally secured upon a screw 95. The plate 94 is adapted to have a pivotal movement from the known dog-shaft 96, and at its front end the plate 94 is formed with the shoulder 97, which upon the upward movement of the bolt 92 will prevent any undue ascent of said bolt by coming into contact with the known locking bar or shaft 98. The shafts 96 98 are features of the register shown in the aforesaid Letters Patent No. 690,472, dated January 7, 1902. The rear portion of the plate 94 is formed with the slot 99, which passes upon a groove formed in the driving-shaft 53 and the side surfaces of which slot 99 are on the arc of a circle struck from the center of the shaft 96. Upon one face of the plate 94 is pivotally secured a plate 100, having the arm 101 projected toward the driving-shaft 53. The plate 100 is formed with the downwardly-projecting arm 102, to which is connected the spring 103, whose lower end is connected with the base-plate of the register mechanism, as shown in Figs. 20 and 22. The spring 103 is depended upon to move the rear portion of the plate 94 to its lower position (shown in Fig. 22) when this result is permitted by the mechanism presently to be described. Upon the face of the plate 94 is also pivotally secured the dog 104, which is provided with a pin 105, Fig. 23, projecting through a slot 106, formed in the plate 94. The projecting end of the pin 105 is connected by a spring 107 with a stationary pin 108, secured to the plate 94, this spring 107 constantly exerting a tension to impel the dog 104 to its lower position. The slot 106 permits the dog 104 to perform its pivotal movement, and the ends of the slot 106 prevent said dog 104 from moving unduly in either direction. Above the plate 100 is provided a pin 109, which operates as a stop to prevent any undue upward movement of the arm 101, constituting a part of said plate 100. Upon the driving-shaft 53 is secured a pin 110, which is utilized during the upward motion of the operating crank-handle 54 to act upon the arm 101 of the plate 100 and also upon the dog 104, as will presently be described. The cash-drawer 51 has in its partition 111 a recess 112 to receive the lower end of the bolt 92 when the latter is in its lower position, and at the rear of the recess 112 the said partition 111 has applied to its upper edges an angle-iron 113, Fig. 24, upon which is formed a cam 114. The front end of the angle-iron 113 engages the lower rear portion of the bolt 92 when the latter is in its lower position, as shown in Fig. 22, and thereby the cash-drawer 51 becomes locked in its closed position. The cam 114 is in the rear of the front edge of the angle-iron 113 and its purpose is to act upon and drive upward the bolt 92 after said bolt has been elevated by the pin 110 on the driving-shaft 53 to the position in which said bolt is illustrated by full lines in Fig. 20, the lower end of the bolt 92 at such time being just above the upper horizontal surface of the front end of the angle-iron 113.

The operation of the drawer-locking feature of the invention will now be described. In Fig. 22 the parts are shown in their normal position, with the bolt 92 locking the cash-drawer 51 in its closed position. In this condition of the parts the operating crank-handle 54 will be in its upper position. In the event of a sale having been made the operating crank-handle will be turned to its lower position and will turn the driving-shaft 53 downward toward the front of the machine, and this movement of the driving-shaft 53 will result in the pin 110 thereon being carried downward against and below the arm 101 of the plate 100. During this downward movement of the pin 110 it will strike the arm 101 and turn the plate 100 against the stress of the spring 103 and pass below said arm 101, the then contacting surfaces of the pin 110 and arm 101 being rounded to permit the passage of the pin 110 by said arm 101. The fact that the pin 110 on its downward movement merely turned the plate 100 on its pivot left the plate 94 and the other parts carried thereby undisturbed, the end of the dog 104 remaining in its normal position resting upon the upper surface of the shaft 53. During the downstroke of the exposed operating crank-handle 54 the cash-drawer 51 remains locked. Upon the return of the operating crank-handle 54 to its upper position the movement of the driving-shaft 53 will carry the pin 110 upward against the arm 101 of the plate 100, and said pin 110 pressing against said arm 101 (the plate 100 being then prevented from turning by the stop-pin 109) will elevate the rear portion of the plate 94 until the bolt 92 has reached the position illustrated by full lines in Fig. 20, the lower end of the bolt 92 then escaping the upper front edge of the angle-iron 113. When the parts are in this condition, which is before the crank-handle 54 has reached its upper position, the spring 52 in the rear of the cash-drawer will drive the latter to its open position, and the movement of the cash-drawer will cause the cam 114 to move against the lower edge of the bolt 92 and drive the latter a short distance farther upward, this additional upward movement of the bolt 92 being governed by the height of the cam 114. When the bolt 92 has been moved to its full upward position by the cam 114, it will be locked in that position by reason of the fact that the dog 104 will, due to the upward movement of the rear portion of the plate 94 and under the action of the spring 107, pass into alinement with the center of the driving-shaft 53, as shown by dotted lines in Fig. 20, where said dog 104 will operate as a prop or brace to hold the plate 94 and bolt 92 in their upward position. It is the purpose of this part of the invention to compel the operator to return the crank-handle 54 all the way up to its normal position before the cash-drawer 51 can be again locked in its closed position. If the operator should omit to continue the crank-handle 54 on its upward motion, the dog 104 would remain in position, propping the bolt 92 in its extreme upward position, and while the bolt 92 is in its extreme upward position it will be seen that the cash-drawer 51 cannot be locked in closed position. The operator can only restore the bolt 92 into a position in which it may relock the cash-drawer by moving the handle 54 to its full upward position, and during the movement of the crank-handle 54 to its full upward position the driving-shaft 53 will carry the pin 110 against the dog 104 and turn it upward from its alined position, (indicated by dotted lines in Fig. 20,) and thereby permit the spring 103 to pull the plate 94 and bolt 92 to their lower normal position, (shown in Fig. 22,) the dog 104 being thus restored to its normal position, where it will rest upon the upper surface of the driving-shaft 53. When the bolt 92 is in its lower position, the pin 110 on the driving-shaft 53 will be in its upper normal position, (shown in Fig. 22,) and at such time the cash-drawer may be pushed inward against the bolt 92, the latter being forced upward and riding on the upper edges of the angle-plate 113 and cam 114 and finally being projected downward into the recess 112 in the drawer-partition 111, where it will operate to lock the cash-drawer at its inward position.

The means for compelling the operator to close the cash-drawer after each registration of a sale and before another registration can be effected are illustrated more especially in Figs. 5, 8, 13, 14, and 15, and these means comprise a pivoted lever 115; a setting-arm 116, pivoted to the front end thereof; a rear projection 117, Fig. 8, on the cash-drawer; a spring 118, connected with the lever 115, and a recess 119, Figs. 7 and 7ª, in the sleeve 80 and adapted to be engaged by a detent 120, formed on the lever 115. The lever 115 is pivotally secured, as shown in Fig. 8, to a supporting-plate bracket 121, and the rear end of said lever 115 is equipped with a downwardly-extending arm 122, which is adapted to project downward through a slot in the base-plate of the register mechanism. The spring 118 is secured at one end to the downwardly-projecting arm 122 and at the other end to the bracket 121, and the normal tension of this spring 118 is exerted to thrust the arm 122 downward. The lever 115 is provided at the upper edge of its front portion with the detent 120, which at the proper time will enter the recess 119 of the sleeve 80, connected with the driving-shaft 53, to prevent the downward motion of the operating crank-handle 54. At its front end the lever 115 is connected with the setting-arm 116, which is a sheet-metal arm provided at its upper end with a finger-piece 123, and the purpose of which is simply to hold the lever 115 out of operation and idle when the owner of the register having access to the interior thereof so desires. The upper portion of the arm 116 turns inward against the supporting-plate 124 for the interior mechanism and is formed with the elongated slot 125 and recess 126, adapted to receive the screw 127, projecting out from said supporting-plate 124. By pushing downward on the finger-piece 123 of the setting-arm 116 and moving said arm on its pivot so that the screw 127 will enter the recess 126 thereof the said screw will hold the setting-arm 116 stationary, (in the position shown in Fig. 8,) with the rear portion of the lever 115 in an elevated position, in which position the lever 115 will be inoperative and perform no function, the detent 120 of said lever 115 being at this time below the recess 119 of the sleeve 80 and being incapable of engaging said recess. When the owner of the register so desires, he may by thus setting the arm 116 and lever 115 render it unnecessary for the operator to close the cash-drawer after each registration and before another registration is effected. When the arm 116 is moved on its pivot to carry the slot 125 thereof upon the screw 127, the spring 118 will be free to exert its force to drive the arm 122 of the lever 115 downwardly. When the cash-drawer is in closed position, the projection 117 thereof will engage the arm 122 and hold the lever 115 in stationary position, with its detent 120 free of the sleeve 80. After the crank-handle 54 has been fully operated and the cash-drawer is in its open position the arm 122 will extend into the path of the projection 117 and the detent 120 will engage the sleeve 80 and lock the handle 54 against movement, thereby preventing it from being operated while the said drawer is open. When the cash-drawer is pushed to its closed position, its projection 117 will engage and elevate the arm 122 and turn the lever 115 to carry the detent 120 from the sleeve 80, and thus leave the crank-handle 54 free to be operated when occasion requires.

The means for locking the registering-wheels at the time they have reached the limit of their proper movement, so that they cannot by undue momentum or otherwise be forced beyond the proper limit of their rotation, are more especially illustrated in Figs. 2 to 6 inclusive, and these means comprise a pivoted dog 130, pivotally secured to a rigid bracket 131, and a pin 132, secured to the driving-shaft 53 in proper relation to engage the arm 133 of said dog 130 and cause the notched upper end of said dog to engage the gear-wheel 134, connected with the registering-wheels 57, as shown in Figs. 2 and 5. It will be remembered that the registering-wheels 57 are in their lower position while being rotated to effect the registration. When the exposed crank-handle 54 is moved upward to its normal position, the pin 132 will ascend from the arm 133 of the dog 130 and the spring 135 will move the upper end of said dog outward from the gear-wheels 134, so that said dog may not interfere with the proper elevation of the registering-wheel shaft. The registering-wheels 57 will preferably be used in pairs, as shown in Fig. 5, and hence we provide the upper end of the dog 130 with the rearwardly-projecting flanges 136, containing the notches 137 to pass upon the teeth of a pair of the gear-wheels 134, as indicated in Fig. 5, the one dog 130 thus serving for two registering-wheels 57. When there are more than one pair of registering-wheels 57, the number of dogs 130 employed will be correspondingly increased, so that for each pair of the registering-wheels one dog 130 will be employed. The shaft 53 carries one pin 132 for each dog 130.

The registering-wheels 57 and gear-wheels 134, connected therewith, together with the means for operating the same, are clearly shown and described in the aforesaid Letters Patent No. 677,896, dated July 9, 1901, and No. 690,472, dated January 7, 1902.

The next feature of the invention to be described is the means whereby the pawl 61 while supporting the frame 60 for the indicating-cylinders 59 and while the operating crank-handle 54 is in its upper position is relieved of spring tension holding it in position, so that upon the movement of any one of the actuating hand-levers 55 the said pawl 61 may be moved from its supporting position with the minimum effort on the part of the operator. The pawl 61 (shown in Fig. 2) for supporting the indicating-cylinders 59 in their upper position is fully described and illustrated in the aforesaid Letters Patent No. 677,896, granted July 9, 1901, in which patent the said pawl is numbered 86 and is identical in every respect with the pawl 61 shown in the present application. The pawl 61 is moved to its supporting position (shown in Fig. 2) when the operating crank-handle 54 is moved to its lower position and the indicating-cylinders 59 have ascended to their upper position, and the pawl 61 is tilted rearward from its supporting position when another sale is effected by the movement of any one of the actuating-levers 55, said levers then moving a rack-bar 160, Figs. 1 and 2, against the short pawl 161, connected with the rock-shaft 62, carrying the pawl 61, the pawl 161 being thus turned slightly rearward and turning the rock-shaft 62 and pawl 61 rearward, withdrawing the pawl 61 from the frame 60, supporting the indicating-cylinders 59. The frame 60 and cylinders 59 are moved in a well-known manner to their upper position when the exposed operating crank-handle 54 is moved to its lower position, and at such time in the construction described in said Patent No. 677,896 the spring numbered 89 in Fig. 8 of said patent was utilized to draw the upper end of the pawl 61 into its supporting position. (Shown in Fig. 2.) In the construction shown in said Patent No. 677,896 the said spring (numbered 89 in said patent) maintained the supporting-pawl (numbered 86 in said patent) in position, and when it was desired to remove the said supporting-pawl from its supporting position the operator when moving the actuating hand-levers had to overcome the force of the said spring 89. To obviate this necessity of overcoming the force of said spring 89 is the purpose of this part of the present invention, and the means for carrying this part of the invention into effect are more clearly illustrated in Figs. 2 and 6, wherein it will be seen that at the left-hand end of the known rock-shaft 62 is provided an arm 162, which is connected by a spring 163 with a lever-arm 164, the latter being at its lower end secured to the plate 165, pivotally mounted at 166 and carrying in its forwardly-projecting arm 167 the left-hand end of the registering-wheel shaft 56. The plate 165 is connected with a spring 168, which serves to normally throw the upper end of the lever-arm 164 rearward toward the rock-shaft 62 and to yieldingly maintain the registering-wheel shaft 56 in its upper position. In Fig. 6 the parts are shown in the position they occupy when the registering-wheel shaft 56 is in its lower position and the exposed operating crank-handle 54 is in its lower position. Upon the left-hand end of the main driving-shaft 53 is secured a cam 169, adapted to engage a roller 170 on the plate 165, and when the operating crank-handle 54 is moved to its lower position the driving-shaft 53 will move the cam 169 against the roller 170 and force the lower part of the plate 165 rearward, thereby effecting the lowering of the registering-wheel shaft 56 and the movement of the lever-arm 164 frontward, thereby causing the spring 163 to pull against the arm 162 and turn the rock-shaft 62, pawls 161, and supporting-pawl 61 frontward, thereby enabling the pawl 61 to engage the supporting-frame 60 for the indicating wheels or cylinders 59 and support said cylinders in their upper position. The spring 163 thus when the operating crank-handle 54 is moved to its lower position yieldingly pulls the pawl 64 forward to its supporting position, (shown in Fig. 2,) and the spring 163 will remain under tension so long as the operating crank-handle 54 is in its lower position. When, however, the operating crank-handle 54 is returned to its upper position, the driving-shaft 53 will carry the cam 169 downward from the roller 170 of the plate 165 and the spring 168 will turn the said plate 165 downward, thereby elevating the registering-wheel shaft 56 and causing the lever-arm 164 to approach the rock-shaft 62, thereby taking all of the tension off of the spring 163 and allowing the pin 171 free play in the elongated slot formed in the link 172, which serves as a means for connecting the rear end of the spring 163 to the arm 162. Under this condition, which prevails when the operating crank-handle 54 is in its upper position, there is no spring tension on the rock-shaft 62 or supporting-pawl 61, and this is the purpose sought to be accomplished. When, therefore, another sale has been made, the operator on moving any one of the hand actuating-levers 55 will not in order to move the supporting-pawl 61 from the frame 60 be compelled to overcome the force of a spring, because at such time there is no spring tension on the pawl 61 and the latter is simply acting as a prop to support the indicating-cylinders in their upper position. Under this condition, therefore, when the operator does move any one of the actuating hand-levers 55 he will only be compelled to exert sufficient force to cause the rack-bar 160 to tilt the short pawls 161 and rock-shaft 62 rearward, thereby moving the pawl 61 from position supporting the frame 60. When the operator is thus engaged in moving the pawl 61 from its supporting position, the elongated slot in the link 172, Fig. 6, will permit of the movement of the pin 171 in said link without restraint, and hence at this time the spring 163 will exercise no influence against the pawl 61. Upon the tilting of the pawl 61 from its supporting position the indicating-cylinders 59 will descend and the operator will draw the crank-handle 54 to its downward position, and this, as above explained, will effect the forward movement of the upper part of the lever-arm 164 and the placing of the spring 163 under tension, the spring 163 at such time serving to keep the pawl 61 under a constant tension, pulling it toward the supporting-frame 60 for the indicating-cylinders, so that when said cylinders are again elevated, which happens when the crank-handle 54 reaches its lower position, the pawl 61 may, as before, engage and support the frame 60 for said cylinders.

The plate 165 at the left-hand end of the operative mechanism is a duplicate of the plate numbered 52 in the aforesaid Letters Patent No. 690,472, dated January 7, 1902, with the exception that in the present instance the plate 165 is utilized as a means for carrying and moving the lever-arm 164, to which the spring 163 is connected.

The general character and operation of the cash-register shown, less the novel features herein claimed, are fully described and illustrated in the several Letters Patent hereinbefore specifically referred to, and the operation of the several features and combinations made the subject of this application has been sufficiently described hereinbefore in connection with the explanation of the construction of the parts.

What we claim as our invention, and desire to secure by Letters Patent, is—

1. In a cash-register, the driving-shaft, the registering mechanism operable from said shaft, the exposed crank-handle for operating said shaft, and the cash-drawer, combined with means for automatically locking said crank-handle in its normal initial position when it is moved to that position while the cash-drawer is open, means operable from the cash-drawer for releasing said locking means when said drawer is moved to its closed position, and means operable by the owner of the register, for securing said locking means out of operation, so that said crank-handle may be operated when the cash-drawer is open; substantially as set forth.

2. In a cash-register, the driving-shaft, the registering mechanism operable from said shaft, the exposed crank-handle for operating said shaft, and the cash-drawer, said crank-handle having the recess 119 in its hub, combined with the pivoted lever 115 having the detent 120 for engaging said recess and locking said crank-handle in its initial normal position when said handle is moved to that position while the said cash-drawer is open, the spring connected with said lever for automatically moving it to its locking position, and means operable from the cash-drawer for releasing said lever from locking engagement with said crank-handle when the said drawer is moved to its closed position; substantially as set forth.

3. In a cash-register, the driving-shaft, the registering mechanism operable from said shaft, the exposed crank-handle for operating said shaft, and the cash-drawer, combined with the pivoted lever for automatically locking said crank-handle in its normal initial position when it is moved to that position while the cash-drawer is open, means operable from the cash-drawer for releasing said lever when said drawer is moved to its closed position, the arm 116 pivotally secured to said lever and having the connected recess 126 and slot 125, and the pin 127 upon which said slot may freely move and which when in said recess will lock said lever in an inoperative position so that then the said crank-handle may be freely operated while said cash-drawer is open; substantially as set forth.

4. In a cash-register, the driving-shaft, the registering mechanism operable therefrom, the exposed crank-handle for operating said shaft, the ratchet-plate 63 rigid on said shaft and having at its ends the toes 73, 76, the pivoted pawl-plate 64 having its pawl-arms spanning a portion of said ratchet-plate for coöperation therewith and to be respectively acted on by said toes, and the spring-pressed pawl 65 to engage said plate 64 and permit of the change in position of the same under the action of said toes, the said pawl-plate 64 and pawl 65 being respectively provided with the coöperating oppositely-beveled end and teeth, combined with the plate 66 carried by said pawl-plate 64 and having the projections 67, and the pins 68, 69 carried by said ratchet-plate 63 for respectively engaging said projections 67 under conditions of improper movements of said crank-handle to shift the said pawl-plate 64 and compel the full stroke of said handle; substantially as set forth.

5. In a cash-register, the driving-shaft, the registering mechanism operable therefrom, the exposed crank-handle for operating said shaft, the ratchet-plate 63 rigid on said shaft and having at its ends the toes 73 76, the pivoted pawl-plate 64 having its pawl-arms spanning a portion of said ratchet-plate for coöperation therewith and to be respectively acted on by said toes, and the spring-pressed pawl 65 to engage said plate 64 and permit of the change in position of the same under the action of said toes, the said pawl-plate 64 and pawl 65 being respectively provided with the coöperating oppositely-beveled end and teeth, combined with the projections 67 and pins 68, 69, respectively carried by said pawl-plate 64 and ratchet-plate 63, said projections and pins idly passing each other during the proper movements of said crank-handle and arranged to engage each other under improper movements of said crank-handle to shift the said pawl-plate 64 and compel the full stroke of said handle; substantially as set forth.

6. In a cash-register, the driving-shaft, the registering mechanism operable therefrom, the exposed crank-handle for operating said shaft, the ratchet-plate 63 rigid on said shaft and having at its ends the toes 73, 76, the pivoted pawl-plate 64 having its pawl-arms spanning a portion of said ratchet-plate for coöperation therewith and to be respectively acted on by said toes, and the spring-pressed pawl 65 to engage said plate 64 and permit of the change in position of the same under the action of said toes, the said pawl-plate 64 and pawl 65 being respectively provided with the coöperating oppositely-beveled end and teeth, combined with the cam projection 67 and pin 68 respectively carried by said pawl-plate 64 and ratchet-plate 63, said projection and pin being arranged to engage each other and shift the said pawl-plate 64 under the condition of an improper movement being imparted to said crank-handle to compel the full stroke in one direction of said handle; substantially as set forth.

7. In a cash-register, the driving-shaft, the registering mechanism operable therefrom, the exposed crank-handle for operating said shaft, and stops for arresting said shaft at the limit of its movement, said crank-handle having the hub 80, and the adjoining ends of said hub and said shaft being formed with the cam-surfaces 85 and 86, respectively, combined with the rod 82 extending from said shaft through said hub and having the head 83 at its outer end, and the spring 81 confined between said head 83 and the inner end of said hub, whereby upon said shaft reaching the end of its movement said crank-handle may have a slight further movement and be forced outward against the stress of said spring; substantially as set forth.

8. In a cash-register, the driving-shaft, the registering mechanism operable therefrom, the exposed crank-handle for operating said shaft, and stops for arresting said shaft at the limit of its movement, said crank-handle having the hub 80, and the adjoining ends of said hub and said shaft being respectively formed with the cam-surfaces 85, 86, and flat or stop surfaces 90, 91, combined with the rod 82 extending from said shaft through said hub and having the head 83 at its outer end, and the spring 81 confined between said head 83 and the inner end of said hub, whereby upon said shaft reaching the end of its movement said crank-handle may have a slight further movement and be forced outward against stress of said spring; substantially as set forth.

9. In a cash-register, the driving-shaft, the registering mechanism operable therefrom, the exposed crank-handle for operating said shaft, the lug 87 on said shaft, and the stops 88, 89, against which said lug may contact to arrest said shaft at the limit of its movements, said crank-handle having the hub 80, and the adjoining ends of said hub and said shaft having the cam-surfaces 85 and 86, respectively, combined with the rod 82 extending from said shaft through said hub and having the head 83 at its outer end, and the spring 81 confined between said head 83 and the inner end of said hub, whereby upon said shaft reaching the end of its movement said crank-handle may have a slight further movement and be forced outward against the stress of said spring; substantially as set forth.

10. In a cash-register, the driving-shaft, the registering mechanism operable therefrom, the exposed crank-handle for operating said shaft, and stops for arresting said shaft at the limit of its movement, said crank-handle having the hub 80, and the adjoining ends of said hub and said shaft having the cam-surfaces 85 and 86 respectively, combined with the rod extending from said shaft through said hub, and the spring 81 pressing said hub toward said shaft, whereby upon said shaft reaching the end of its movement said crank-handle may have a slight further movement and be forced outward against the stress of said spring; substantially as set forth.

11. In a cash-register, the driving-shaft, the registering mechanism operable therefrom, the exposed crank-handle for operating said shaft, and stops for arresting said shaft at the limit of its movement, said crank-handle being on an outer slidable section of said shaft, combined with a spring normally pressing said section toward the end of the body of said shaft, and cams for moving said shaft-section outward against the stress of said spring when said crank-handle is continued in motion after said stops have arrested the shaft proper; substantially as set forth.

12. In a cash-register, the driving-shaft, the registering mechanism operable from said shaft, the exposed crank-handle for operating said shaft, the cash-drawer, the spring for driving said drawer to an open position, and the bolt 92 for locking said drawer in its closed position when said crank-handle has been returned to its initial normal position, said cash-drawer having a shoulder to engage the lower end of said bolt and also having the cam 114 in rear of said shoulder to engage the lower end of said bolt and effect a further upward movement of the same, combined with the pivoted plate 94 passing over said shaft and carrying said bolt, the spring normally drawing said plate and bolt downward toward the locking position of said bolt, the arm 101 on said plate 94 and being under spring tension, the stop 109 on said plate for limiting the upward movement of said arm 101, the spring-dog 104 pivotally secured to said plate 94 and adapted when said plate is in its extreme upper position to engage said shaft and secure said plate in such position and at all other times to simply press against said shaft, and the pin 110 on said driving-shaft and adapted on the upstroke of said crank-handle to first move against said arm 101 to elevate the bolt 92 sufficiently to release the said cash-drawer and then move against and actuate said dog 104 to permit the descent of said bolt 92 to its locking position; substantially as set forth.

13. In a cash-register, the driving-shaft, the registering mechanism operable from said shaft, the exposed crank-handle for operating said shaft, the cash-drawer, the spring for driving said drawer to an open position, and the bolt 92 for locking said drawer in its closed position when said crank-handle has been returned to its initial normal position, said cash-drawer having a shoulder to engage the lower end of said bolt and also having the cam 114 in rear of said shoulder to engage the lower end of said bolt and effect a further upward movement of the same, combined with the pivoted plate 94 carrying said bolt, the spring normally drawing said bolt toward its locking position, means for holding said bolt in its extreme upper position when said bolt is moved to that position by the said cam 114 during the opening of the cash-drawer, and means operable from the driving-shaft for, during the stroke of said crank-handle to its initial normal position, first elevating said bolt sufficiently to release the cash-drawer and permit the said cam 114 to effect the movement of said bolt to its extreme upper position, and then releasing said bolt so that it may descend to its lower locking position, said crank-handle having then arrived at its initial normal position; substantially as set forth.

14. In a cash-register, the driving-shaft, the registering-wheels operable therefrom, and the exposed crank-handle for operating said shaft, combined with means for locking said wheels when they have reached the limit of their proper rotation, said means comprising the pivoted dog 130 having below its upper end the inwardly-projecting arm 133, the spring 135 for normally holding the upper end of said dog in an inoperative position, and the pin 132 on the driving-shaft for engaging said arm 133 and turning said dog inward to lock the registering-wheels when the latter have concluded their proper movement, said spring 135 thereafter serving to move said dog to its inoperative position when said pin 132 is moved from said arm 133; substantially as set forth.

15. In a cash-register, the driving-shaft, the registering-wheels operable therefrom and arranged in pairs, the gear-wheels connected with said registering-wheels, and the exposed crank-handle for operating said shaft, combined with means for locking said wheels when they have reached the limit of their rotation, said means comprising the pivoted dog 130 having at its upper end the rearwardly-projecting notched flanges 136 to engage the said gear-wheels, and below said end, the rearwardly-projecting arm 133, the spring 135 for normally holding the upper end of said dog in an inoperative position, and the pin 132 on the driving-shaft for engaging said arm 133 and turning said dog inward to lock the registering-wheels when the latter have concluded their proper movement, said spring 135 thereafter serving to move said dog to its inoperative position when said pin 132 is moved from said arm 133; substantially as set forth.

16. In a cash-register, the driving-shaft, the registering mechanism, the operating crank-handle, the indicating-cylinders, the vertically-movable frame carrying said cylinders, and the rock-shaft 62 and pawl-arm 61 carried thereby for supporting said frame and cylinders in their upper position, combined with the crank-arm 162 on said rock-shaft, the pivoted lever-arm 164, the spring 163 connecting said arm 164 with said crank-arm, the pivotally-mounted plate 165 carrying said lever-arm 164 and also the registering-wheel shaft, the spring 168 connected with said plate 165 and acting to elevate said registering-wheel shaft and move said lever-arm 164 toward said rock-shaft, and means operable from said driving-shaft for moving said lever-arm 164 in a direction from said rock-shaft during the movement of said operating crank-handle from its initial normal position, thereby placing said arm 61 under the tension of said spring 163, said spring 168 on the return movement of said operating crank-handle serving to restore said lever-arm 164 to its normal initial position and relieve the tension of said spring 163 from said arm 61 then supporting said indicating-cylinders in their upper position; substantially as set forth.

17. In a cash-register, the driving-shaft, the registering mechanism, the operating crank-handle, the indicating-cylinders, the vertically-movable frame carrying said cylinders, and the rock-shaft 62 and pawl-arm 61 carried thereby for supporting said frame and cylinders in their upper position, combined with the spring 163 operatively connected with said arm 61 for acting on the same during certain intervals, and means intermediate said spring and said driving-shaft and operable from the latter for placing said arm 61 under the tension of said spring during the movement of said operating crank-handle from its initial normal position, said spring 163 while the said crank-handle is in its initial normal position being relaxed and performing no function; substantially as set forth.

Signed at New York, in the county and State of New York, this 26th day of February, 1902.

ELMER S. SMITH.
HARVEY GILES.

Witnesses:
CHAS. C. GILL,
ARTHUR MARION.